Figure 7:
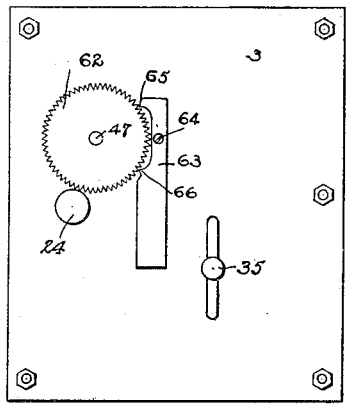

T. W. SMALL.
STREET INDICATING MECHANISM.
APPLICATION FILED NOV. 24, 1909.
1,210,554.
Patented Jan. 2, 1917.
3 SHEETS—SHEET 1.
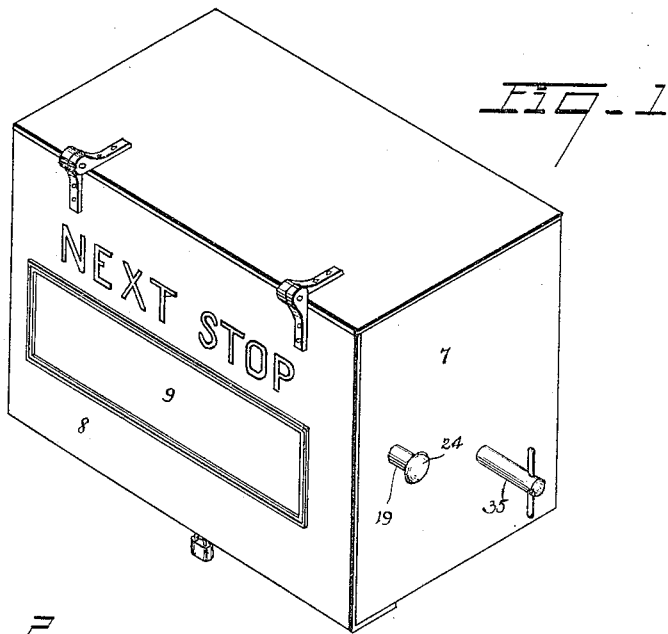
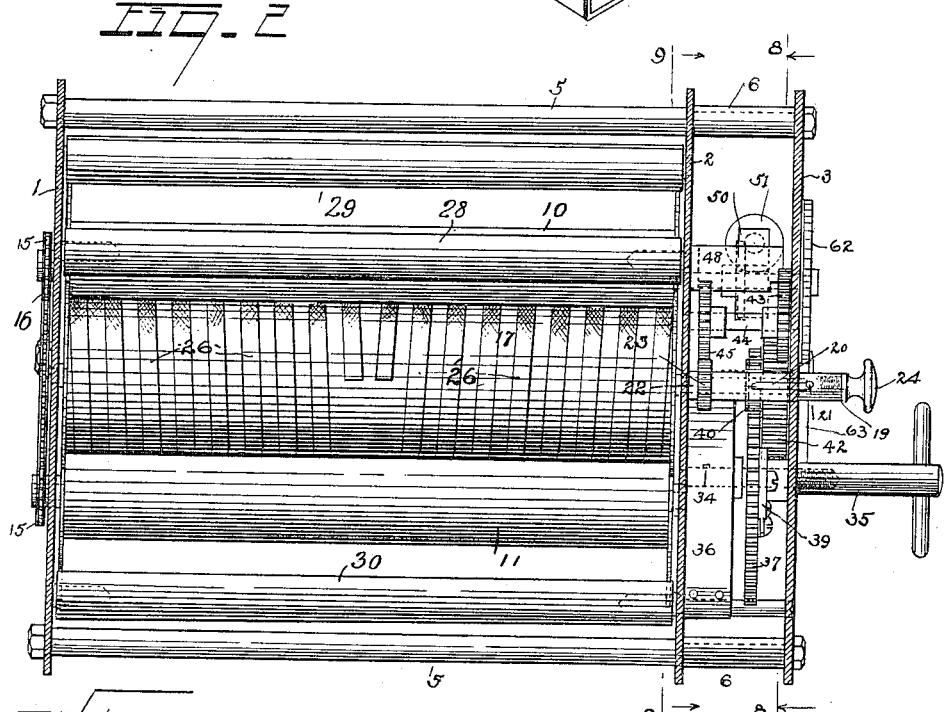

T. W. SMALL.
STREET INDICATING MECHANISM.
APPLICATION FILED NOV. 24, 1909.
1,210,554.
Patented Jan. 2, 1917.
3 SHEETS—SHEET 2.
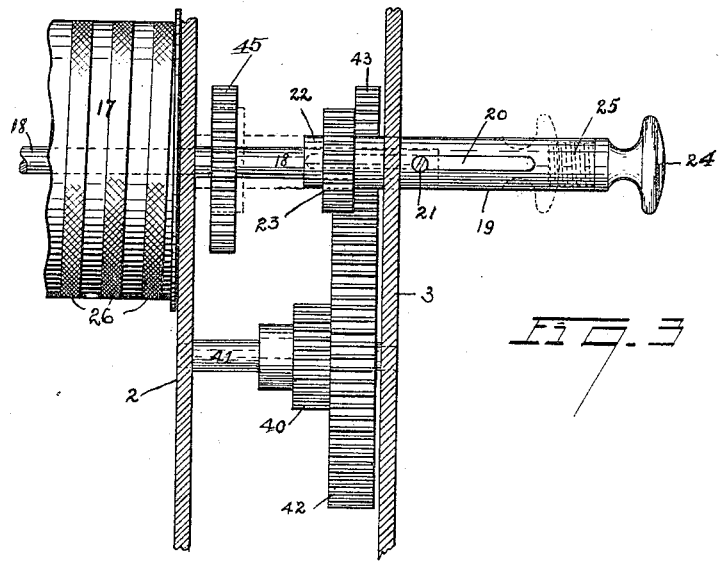
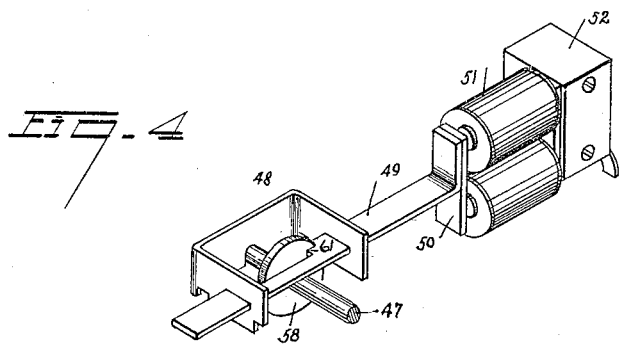
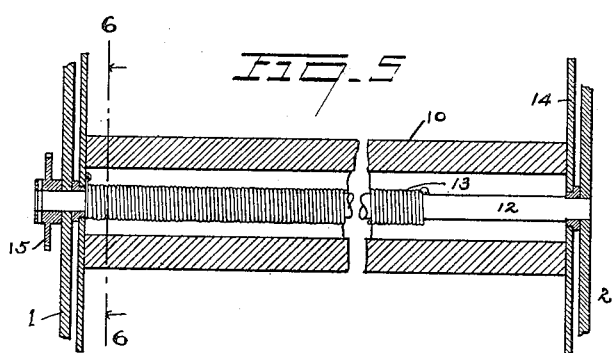
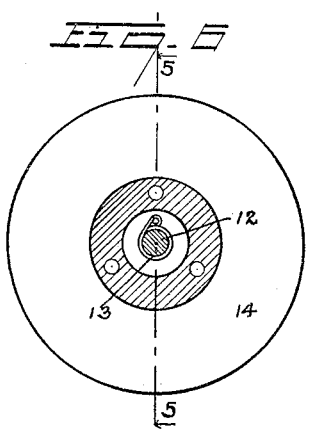

T. W. SMALL.
STREET INDICATING MECHANISM.
APPLICATION FILED NOV. 24, 1909.

1,210,554.

Patented Jan. 2, 1917.
3 SHEETS—SHEET 3.

Witnesses

Inventor
Thos. W. Small
By Bates, Fouts & Hull
Attys

UNITED STATES PATENT OFFICE.

THOMAS W. SMALL, OF CLEVELAND, OHIO, ASSIGNOR TO THE ACME AUTOMATIC STREET INDICATING COMPANY, OF CLEVELAND, OHIO, A CORPORATION OF OHIO.

STREET-INDICATING MECHANISM.

1,210,554.                Specification of Letters Patent.         Patented Jan. 2, 1917.

Application filed November 24, 1909. Serial No. 529,681.

*To all whom it may concern:*

Be it known that I, THOMAS W. SMALL, a citizen of the United States, residing at Cleveland, in the county of Cuyahoga and State of Ohio, have invented a certain new and useful Improvement in Street-Indicating Mechanisms, of which the following is a full, clear, and exact description, reference being had to the accompanying drawings.

This invention relates to street indicating mechanism, and has for its general object to improve the efficiency, construction and operation of such mechanism.

Generally speaking, the invention may be defined as consisting of the combinations of elements embodied in the claims hereto annexed and illustrated in the drawings forming part hereof, wherein—

Figure 8:
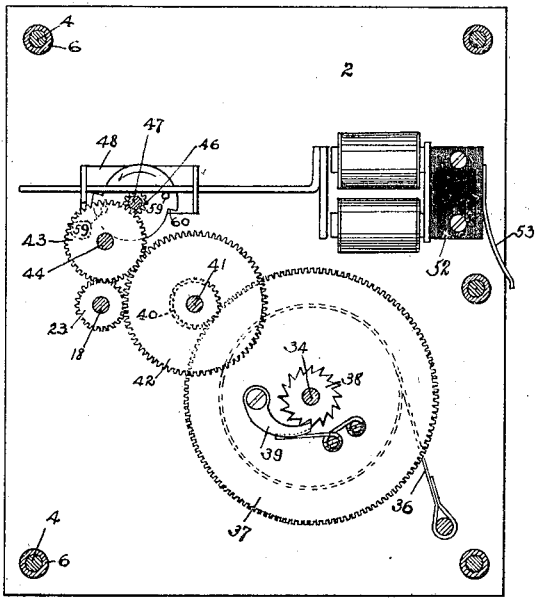
Figure 9:
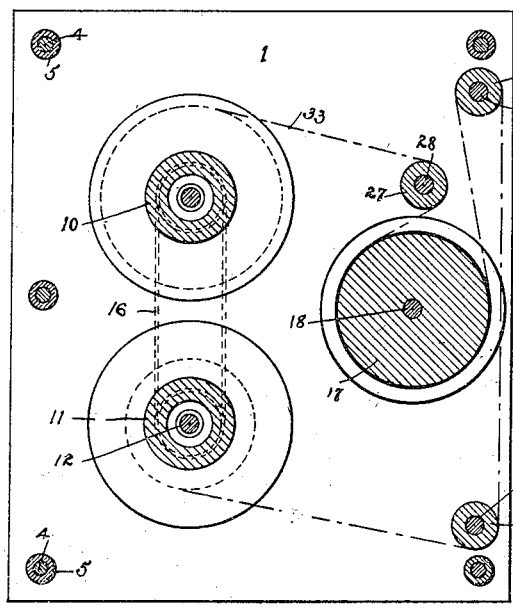
Figure 10:
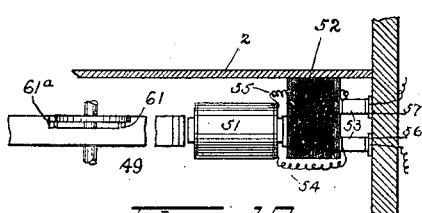

Figure 1 represents a perspective view of a casing containing my mechanism, the reversing and winding handles being shown outside said casing; Fig. 2 represents a vertical sectional view through the front of the frame carrying my mechanism; Fig. 3 represents a detail of the driving and reversing devices by means of which a strip of cloth or similar material having thereon the appropriate inscriptions is driven in reverse directions; Fig. 4 represents a perspective detail of the electro-magnetic controlling mechanism; Fig. 5 represents an enlarged sectional detail of one of the two spring-barrel rollers on which the strip is wound; Fig. 6 is a sectional view, corresponding to the line 6—6 of Fig. 5; Fig. 7 is an elevation of the escapement mechanism for regulating the speed at which the strip is fed; Fig. 8 is a sectional view, corresponding to the line 8—8 of Fig. 2; Fig. 9 is a similar view, corresponding to the line 9—9 of Fig. 2, and Fig. 10 is a detail of the electro-magnetic controlling mechanism.

The indicating mechanism shown herein is an improvement upon the type shown in my Patents Nos. 738,366, dated September 8th, 1903, and 846,513, dated March 12th, 1907. The frame by which the mechanism is carried consists of the vertical plates 1, 2 and 3, said plates being held together by means of rods 4 having distance sleeves 5 and 6 thereon, said sleeves serving to space the aforesaid plates apart. The plates 2 and 3 are relatively close together and provide a space for the reception of the driving mechanism, gears, and automatic controlling mechanism, while the plates 1 and 2 are spaced farther apart and receive the various rollers by which the strip is fed across a sight opening in a casing into which the frame is inserted. The casing is shown at 7 in Fig. 1, and is provided with a front plate 8 having a sight opening provided preferably with some transparent substance 9 through which the designations on the strip may be observed.

Mounted between the plates 1 and 2 are the drums or rollers to which the opposite ends of the strip are secured. These drums or rollers are shown as spring barrels, 10 and 11, each mounted on a shaft 12 journaled in the frame plates, each barrel being hollow, with a helical spring 13 located in the bore and connected at one end with the barrel and at the other end with the shaft 12. Each drum or barrel is provided at its opposite ends with flanges 14, which flanges serve to confine the band or strip as it is wound upon and unwound from the drum or barrel and serve as a connection for the springs 13. Each shaft projects through the plate 1 and is provided at its end with a sprocket 15. A chain 16 is applied to said sprockets, as indicated in dotted lines in Fig. 9, and serves to drive one drum from the other. For convenience of reference, the portion of the casing which is provided with the transparent material 9 will be referred to as the "front" of the casing and the same term will be applied to the corresponding parts of the frame.

17 denotes a feed roller which is located near the front of the frame and is spaced from and intermediate between the spring barrels 10 and 11. This roller is mounted on a shaft 18 which is journaled in the plates 1 and 2 and projects through the plate 3. The shaft is provided with a sleeve 19, which is slidably mounted thereon, said sleeve being provided with a slot 20 extending longitudinally thereof adapted to receive a pin 21 carried by the shaft. The inner end 22 of the sleeve 19 is provided with a gear 23, for a purpose to be described hereinafter, and with an operating knob 24 at the outer end thereof, said sleeve and knob projecting through one end of the casing 7 and the knob being threaded into the sleeve, as shown at 25.

The roller 17 is provided with means whereby the strip which is drawn from the drums or spring barrels thereby may be fed evenly across the sight opening in the front of the casing. It has been found in operation that, when cloth is used as the material on which the street indications are printed or placed, the cloth, being of uneven texture, will be fed in such manner that the designations or indications thereon will be twisted or tilted or otherwise brought out of alinement with the sight opening. In order to enable the cloth to be fed evenly from either of the spring barrels, without wrinkling or "slip" and at the same time preserve the alinement of the indications with the sight opening, I provide the roller 17 with means adapted to engage the strip and at the same time feed the same evenly therearound. I have found that tire tape is admirably adapted for this purpose, the tape being wound around the roller in a spiral from opposite ends of the roller toward the center thereof. This tape is indicated at 26.

27 denotes an idle roller mounted on a shaft 28 journaled in the plates 1 and 2. This roller is located above and close to the roller 17.

29 and 30 denote a pair of idle rollers mounted on shafts 31 and 32, respectively, and located in front of the roller 17 and near the top and bottom of the frame, respectively. The strip, shown in dotted lines at 33, is fed from a spring barrel as 10, around roller 27 and, by the location of said roller and the roller 29 relative to roller 17, the strip is bighted around nearly the entire surface of the latter roller; thence the strip extends around roller 29, down the front of the frame across the sight opening 9, around the roller 30 to the other spring barrel, as 11. When a car equipped with my invention is running in the opposite direction, the feed will be reversed, namely: from the roller 11, around rollers 30, 29, to and around roller 17, around roller 28, to spring barrel 10. The arrangement of the idle rollers is such as to feed the strip in an efficient manner to the roller 17, which serves to pull the strip from either of the spring barrels and to feed the strip across the sight opening with a minimum of friction and loss of power. The chain-and-sprocket connection between the spring barrels adapts the latter to varying conditions of use, and the employment of the spring-barrel construction causes the strip to be fed evenly and accurately from one barrel, around the various rollers, to the other barrel, irrespective of the variations in diameter of the two barrels.

Reference has been made to the reversal of the rotation of the roller 17 and the consequent reversal of rotation of the other rollers and of the spring barrels. The driving mechanism whereby this result may be accomplished will now be described.

34 denotes a shaft which is mounted between the plates 2 and 3 and is provided with a winding stem 35 projecting through the casing 7. Shaft 34 is provided with a spring 36, adapted to be wound by the stem 35, and the shaft is provided with a gear 37 and with a ratchet 38 and a spring-pressed pawl 39. The gear 37 meshes with a pinion 40 on a shaft 41 which is journaled in the plates 2 and 3. This shaft is provided with a wide-faced gear 42 which meshes in turn with a gear 43 on a shaft 44 also mounted between plates 2 and 3. The shaft 44 is provided with a gear 45, similar to the gear 43. The gear 23 on the sleeve 19 is arranged to mesh with the gear 45 when the sleeve is pushed inwardly to the full extent with the inner end of the sleeve abutting against the plate 2 and the pin 21 in engagement with the outer end of the slot 20. When, however, the sleeve is withdrawn to bring the pin against the inner end of the slot 20, the gear 23 meshes with the inner portion of the face of the gear 42, the outer portion of which meshes with the gear 43. The parts will be so arranged that gear 23 will not mesh with the gear 43 when in its outermost position. It will be evident that, when the sleeve 19 is in the position shown in Fig. 2, the roller 17 will be driven in one direction and that, when in the position shown in Fig. 3, the roller will be driven in the opposite direction. This arrangement allows the strip wound upon the spring barrels to be fed in a direction appropriate to that in which the car may be moving.

For the purpose of limiting the feeding of the strip, I provide the electro-magnetic controlling mechanism shown in detail in Figs. 4, 8 and 10. The gear 43 meshes with a pinion 46 on a shaft 47 which is also journaled between the plates 2 and 3. 48 denotes a U-shaped frame or housing having its lower end recessed for application to the shaft 47 and mounted in the space between the plates 2 and 3. This frame is provided in its opposite branches with apertures through which extends a plate 49 carried by and forming an extension of the armature 50 of an electro-magnet 51. This magnet may be of any ordinary type, and comprises a pair of spools mounted upon a fiber block 52, by means of which it is secured to one of the plates, as 2. This block carries a pair of springs 53 to which the opposite ends of the winding of the electro-magnet are connected, as shown at 54 and 55. These springs project beyond the rear edge of the frame plate 2, as appears from Fig. 8, and are adapted to be compressed by and bear firmly against the contacts 56 and 57 respectively, carried by the rear of the casing 7 and connected respectively to the trolley or plow and to the ground. The plate 49 extends through the opposite arms of the frame 48 and is provided with a slot for the reception of the cam 58 on the shaft 47. This cam is provided with a pair of pins 59 located 180 degrees apart and with an abrupt shoulder 60 adjacent each pin and to the rear of the same, with reference to the direction of rotation of the cam. The plate 49 is provided with a ledge 61 which, when the magnet is deënergized and the parts are in the position shown in Fig. 4, is adapted to be engaged by a pin 59 to prevent the rotation of the parts and especially of the feed roller 17 by the spring 36. In passing through a station or other place adapted to make a temporary contact with that portion of the plow, trolley pole, or other device which is electrically connected with the contact 57, the circuit including electro-magnet 51 is closed and the plate 49 is moved in a direction to enable the adjacent pin 59 to clear the ledge 61. This enables the cam 58 to rotate. Ordinarily, before the cam can make a half revolution, the car has passed through the station, deënergizing the magnet. The cam, engaging the edge 61ª of the slot in the plate 49 which is opposite the ledge 61, forces said plate away from the magnet, setting the ledge 61 to be engaged by the other pin. Should the car remain in the station, the magnet will remain energized. As the lowest portions of the cam are substantially opposite the pins 59, this enables whichever pin is beneath the ledge 61 to pass above said ledge before the rotation of the cam is blocked by the edge opposite said ledge. Before the cam can make a half revolution, however, its engagement with the edge of the recess will prevent further rotation of the cam until the magnet is deënergized. When this deënergizing occurs, the cam will itself force the plate 49 to a position to cause the appropriate pin 59 to engage the ledge, and thus it is impossible for the cam to rotate more than a half revolution notwithstanding the length of time that the magnet may be energized. This controlling mechanism is particularly effective and adapted to all ordinary incidents of use and service. It dispenses with the necessity for spring, is positive in operation, is not affected by the jarring due to the travel of the car, and is absolutely reliable in operation.

In order to regulate the speed of rotation of parts to prevent such speed from becoming excessive, I use the escapement shown in Fig. 7. The shaft 47 projects through the frame plate 3 and has mounted thereon a toothed wheel 62. 63 denotes a pendulum escapement pivoted at 64 and provided with projections 65 and 66 adapted to engage the teeth of the wheel 62 in the usual manner. The projections 65 and 66 are inclined, whereby the escapement will be rocked by the action of the inclined edges of the teeth against these projections. The escapement will operate in the usual manner to retard the rotation of the shaft 47, the speed of rotation of said shaft being governed by the number of teeth on the wheel and the moment of inertia of the pendulum.

Having thus described my invention, what I claim is:

1. In an indicating mechanism, the combination, with a flexible name strip and a pair of rollers each having an end of said flexible band or strip operatively connected thereto, of a driving roller substantially parallel to said first rollers, said driving roller having on its outer surface a pair of flexible strips of adhesive material wound spirally thereon and extending in opposite directions from the center thereof, means for rotating said driving roller, and means for maintaining said strip in close contact with said driving roller whereby slipping is prevented.

2. In mechanism of the character set forth, the combination, with a longitudinally shiftable strip of flexible material, of a driving roller journaled transversely to the direction of said strip and having on its outer surface a pair of strips of adhesive material wound spirally thereon and extending in opposite directions from the center thereof, means for rotating said driving roller, and means yieldingly maintaining said shiftable strip in close driving engagement with the major part of the periphery of said driving roller.

In testimony whereof, I hereunto affix my signature in the presence of two witnesses.

THOMAS W. SMALL.

Witnesses:
J. B. HULL,
BRENNAN B. WEST.